United States Patent

Morris et al.

Patent Number: 5,851,273
Date of Patent: Dec. 22, 1998

[54] DYE SET FOR IMPROVED INK-JET PRINT QUALITY

[75] Inventors: Peter C. Morris, San Diego, Calif.; David H. Donovan, Barcelona, Spain; Gregg A. Lane, San Diego, Calif.; Larrie A. Deardurff, Corvallis, Oreg.

[73] Assignee: Hewlett-Packard Company, Palo Alto, Calif.

[21] Appl. No.: 887,164

[22] Filed: Jul. 2, 1997

Related U.S. Application Data

[63] Continuation-in-part of Ser. No. 810,568, Mar. 3, 1997.
[51] Int. Cl.⁶ .................................................. C09D 11/02
[52] U.S. Cl. .................................. 106/31.27; 106/31.43; 106/31.58
[58] Field of Search ..................... 106/31.27, 31.58, 106/31.43

[56] References Cited

U.S. PATENT DOCUMENTS

| | | | |
|---|---|---|---|
| 5,143,547 | 9/1992 | Kappele | 106/31.27 |
| 5,145,519 | 9/1992 | Kappele | 106/31.27 |
| 5,364,461 | 11/1994 | Beach et al. | 106/22 R |

FOREIGN PATENT DOCUMENTS

| | | |
|---|---|---|
| PCTGB9600262 | 8/1996 | WIPO . |
| PCTGB9600300 | 8/1996 | WIPO . |

*Primary Examiner*—Helen Klemanski

[57] ABSTRACT

In accordance with the invention a set of dyes suitable for use in ink-jet inks and method for formulating the same are provided. A specific dye set for formulating the yellow, cyan, magenta, and optionally black inks is disclosed, comprising Direct Yellow 132, Direct Blue 199, Magenta 377, and optionally Pacified Reactive Black 31 dyes, respectively. This dye set provides ink-jet prints able to match printed color standards such as specification for web offset publications (SWOP) and Euroweb, with excellent lightfade and pen reliability performance.

27 Claims, 9 Drawing Sheets

DYE SET FOR IMPROVED INK-JET PRINT QUALITY

CROSS-REFERENCE TO RELATED APPLICATIONS

The present application is a continuation-in-part of application Ser. No. 08/810,568, filed Mar. 3, 1997, by Deardurff et al., and entitled "Dye Set For Improved Ink-Jet Image Quality", and directed to a dye set for providing inkjet images having a true representation skin tone colors.

FIELD OF INVENTION

The present invention generally relates to ink-jet printing, and in particular to a specific dye set for improving ink-jet print quality.

BACKGROUND OF INVENTION

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs fully an order of magnitude lower than comparable products available just a few years ago. Notwithstanding their recent success, intensive research and development efforts continue toward improving ink-jet print quality. A surge in interest in ink-jet printing has resulted in the need to produce high quality prints at a reasonable cost. The challenge remains to further improve the print quality and lightfastness of ink-jet prints. The use of large format ink-jet prints for point-of-purchase displays, posters and signage, requires high-resolution images that are durable.

Color ink-jet printers typically use three inks of differing hues: magenta, yellow, and cyan, and optionally black. The particular set of colorants, e.g., dyes, used to make the inks is called a "primary dye set." A spectrum of colors, e.g., secondary colors, can be generated using different combinations of the primary dye set. In printing processes such as lithography, dye transfer, and some types of thermal transfer, it is possible to vary spot size so that less is demanded of the primary colored inks when producing a good secondary color. When the color inks are used in a binary printing device, that is, one in which a dot of color is either present or absent, e.g., a thermal ink-jet printer, the ability of the primaries to give recognizable secondary colors is even more important. When such device is to be used for printing images that will also be printed and compared to images printed by other modalities such as offset presses or dye sublimation printers, it is important that the colors produced by the inkjet printer are capable of encompassing and matching commonly accepted industry color descriptions, such as specification for web offset publications (SWOP) and Euroscale.

If such ink is to be used in an ink-jet printing device, characteristics such as crusting, long-term stability, and materials compatibility must also be addressed. If the ink is to be used in a thermal ink-jet printer, the further constraint of being thermally stable (kogation-resistant) is added.

In general, a successful ink set for color ink-jet printing must be compatible with the ink-jet pen and the printing system. Some of the required properties for the ink-jet ink include: good crusting resistance, good stability, the proper viscosity, the proper surface tension, little color-to-color bleed, rapid dry time, no deleterious reaction with the printhead components, high solubility of the dyes in the vehicle, consumer safety, low strike through, high color saturation, good dot gain, and suitable color characteristics. Furthermore, the durability of the printed image, e.g., light and water fastness, plays an important role in the quality of the printed ink-jet image.

Any given perceived color can be described using any one of the color spaces, such as CIELAB, and Munsell, as is well known in the art. For example, in the Munsell color space a given color is defined using three terms, Hue (H), Value (V), and Chroma (C). In the CIELAB color space, a color is defined using three terms L*, a*, and b*. L* defines the lightness of a color, and it ranges from zero (black) to 100 (white). The terms a* and b*, together, define the hue. The term a* ranges from a negative number (green) to a positive number (red). The term b* ranges from a negative number (blue) to a positive number (yellow). Additional terms such as h° (hue angle) and C* (chroma) are used to further describe a given color, wherein $$h° = \tan^{-1} b*/a* \quad \text{EQUATION 1}$$

$$C* = (a*^2 + b*^2) \quad \text{EQUATION 2}$$

The L*, a*, and b* or the Munsell H, V, and C and be used to calculate the volume of space that a specific dye set can produce—the larger the volume the more colors the dye set is capable of producing. This volume, referred to color gamut (G), is calculated according to Equation 3.

$$G = \sum_{i=1}^{6} 1/6 * (L*_{white} - L*_{black}) * (a*^2 + b*^2)_i * \cos(\Delta h)_i \quad \text{EQUATION 3}$$

where $i = 6$ colors: C, Y, M, R, G, B

One attribute which is particularly important in imaging (i.e., color rendition of pictures) is ability to reproduce the specification for web offset publications (SWOP) In addition, it is important that the ink-jet print preserve its color characteristics over time as it is exposed to light. Thus, there is a need for more lightfast colorants. It is also of particular importance that when the image does fade, the fading occurs uniformly across all printed colors, thus minimizing the hue shift between the more faded and the less faded colors.

In the CIELAB color space, delta E ($\Delta E$) defines the difference between two sets of colors, such as the color of the printed image and the original object, or the color of the original printed image and the color of the same image after lightfade—the higher the $\Delta E$ number, the more difference between the two colors $$\Delta E = (\Delta L*^2 + \Delta a*^2 + \Delta b*^2)^{1/2} \quad \text{EQUATION 4}$$

Inks are known which possess one or more of the foregoing properties. However, few inks are known that possess all the foregoing properties, since an improvement in one property often results in the degradation of another property. Thus, many inks used commercially represent a compromise in an attempt to achieve an ink evidencing at least an adequate response in each of the foregoing considerations. Accordingly, investigations continue into developing ink formulations which have improved properties and which do not improve one property at the expense of the others. Thus, challenge remains to further improve the print quality and lightfastness of the ink-jet prints without sacrificing pen performance and reliability.

DISCLOSURE OF THE INVENTION

In accordance with the invention, inks suitable for use in ink-jet inks and method for formulating the same are provided. A specific dye set for formulating the yellow, cyan, magenta, and optionally black, inks is disclosed, comprising Direct Yellow 132, Direct Blue 199, Magenta 377, and Pacified Reactive Black 31, respectively. This dye set provides excellent ink-jet prints having excellent lightfastness when exposed to direct sun light as well as office light and, large color gamut which encompasses the color space for the specification for web offset publications (SWOP).

In the practice of the invention, the yellow, cyan, and magenta aqueous inks each comprise from about 0.1 to about 5 wt % of at least one dye with the black ink comprising from about 1 to about 10 wt % of at least one colorant; from about 5 to about 20 wt % of at least one organic solvent; 0 to about 1.5 wt % of at least one component independently selected from the group consisting of surfactants, buffers, biocides, and metal chelators; and the balance water.

The present ink compositions offer good lightfastness, waterfastness, and excellent color gamut, and are reliable (e.g., kogation and crusting (the dyes are highly soluble and easily re-solubalized) and performance) in an ink-jet printing engine.

DETAILED DESCRIPTION OF THE INVENTION

Figure 1A:
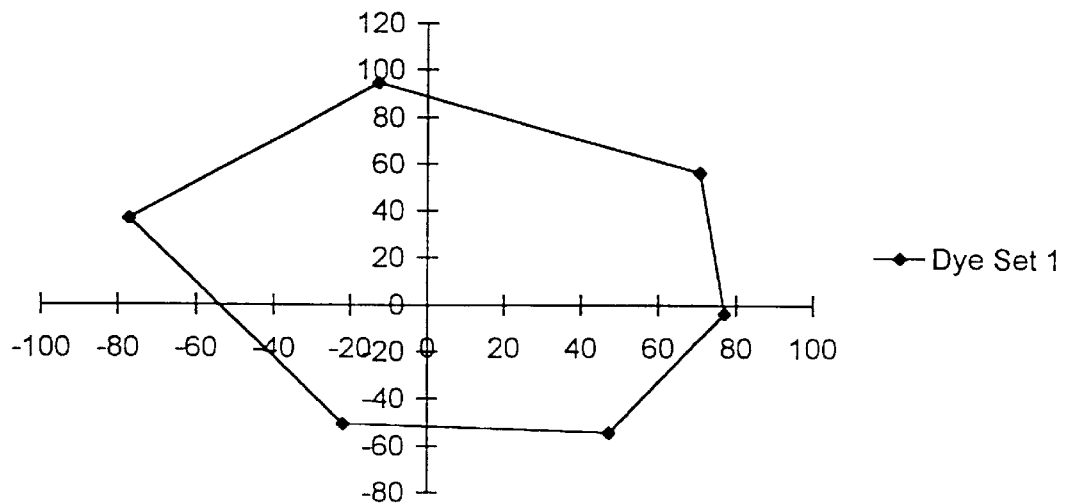
FIGS. 1a through 1d depict the color space for Dye Sets 1 through 4.
Figure 1B:
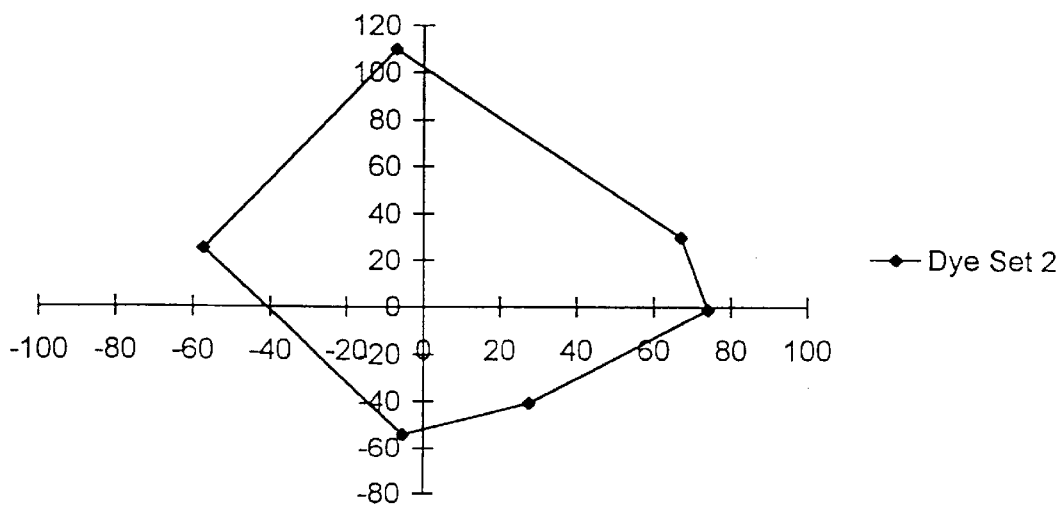
Figure 1C:
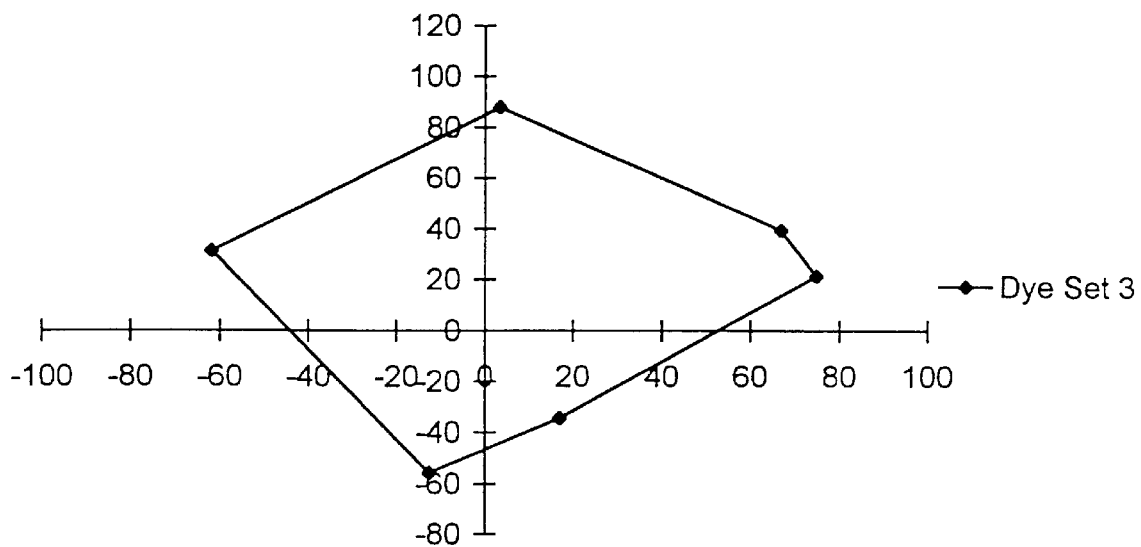
Figure 1D:
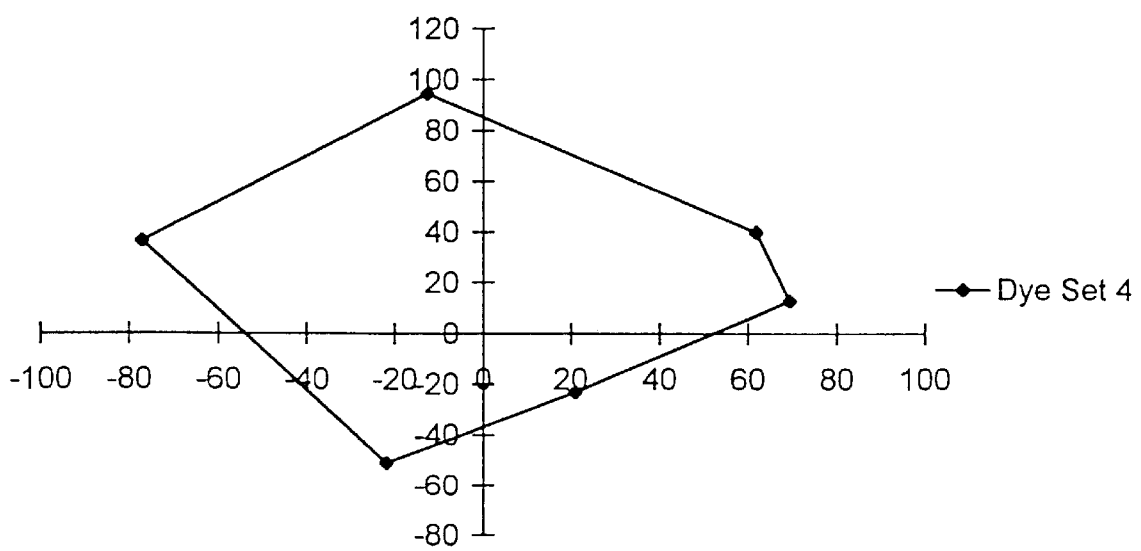
Figure 2A:
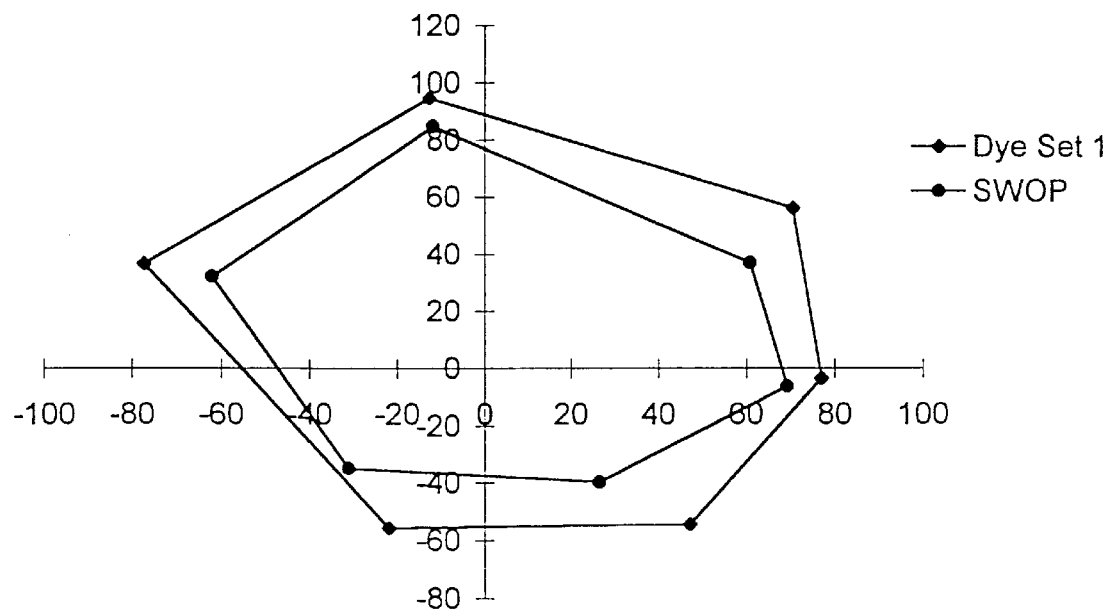
FIGS. 2a through 2g depict the comparison of color space between Dye Sets 1 through 4 with SWOP and the comparison of Dye Set 1 against Dye Sets 2 through 4.
Figure 2B:
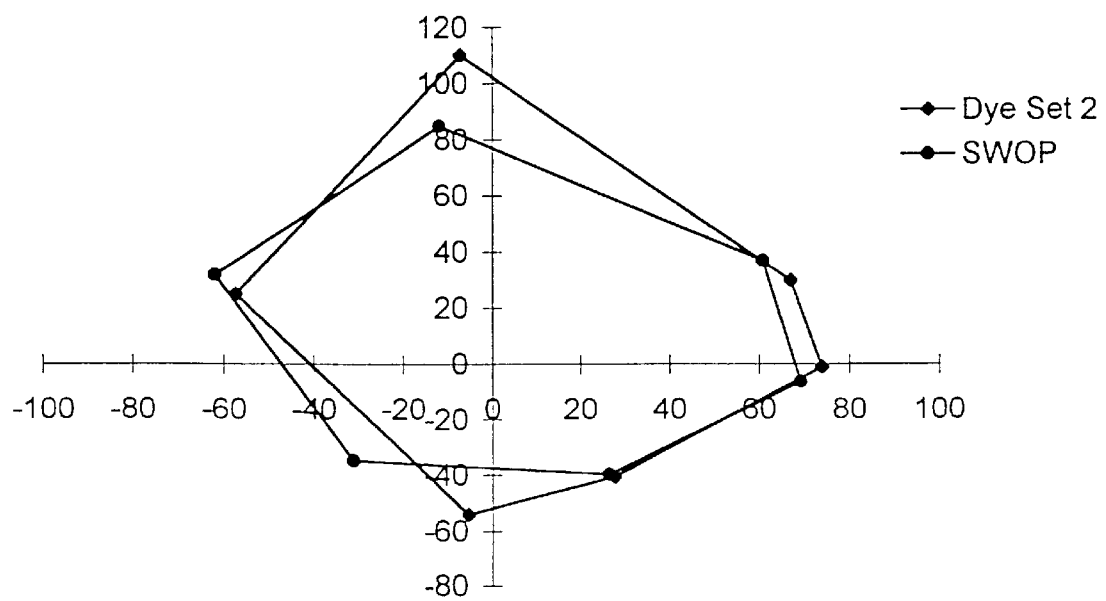
Figure 2C:
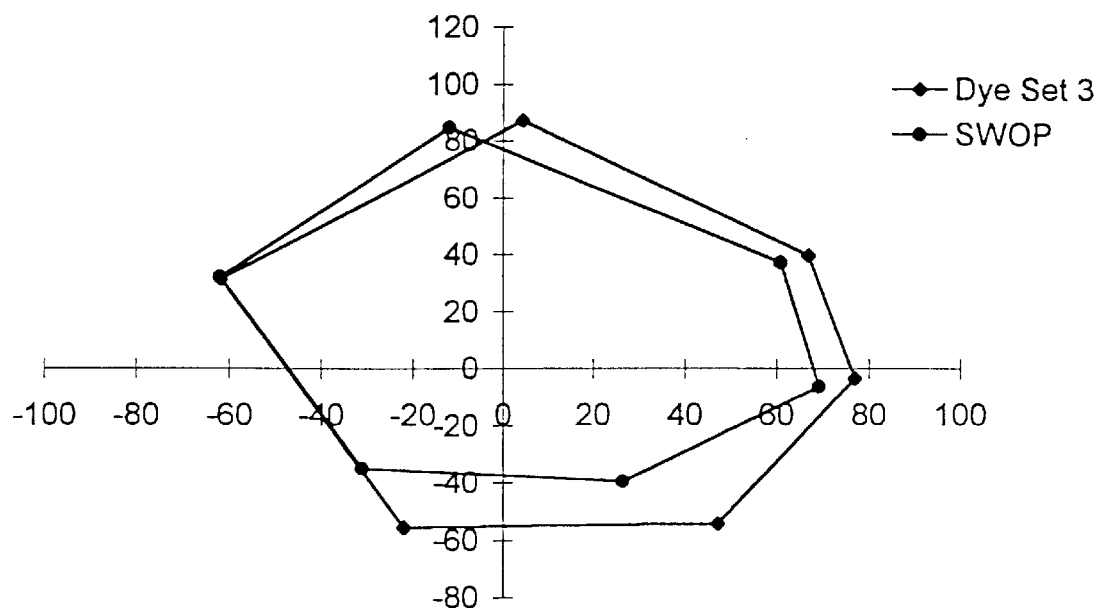
Figure 2D:
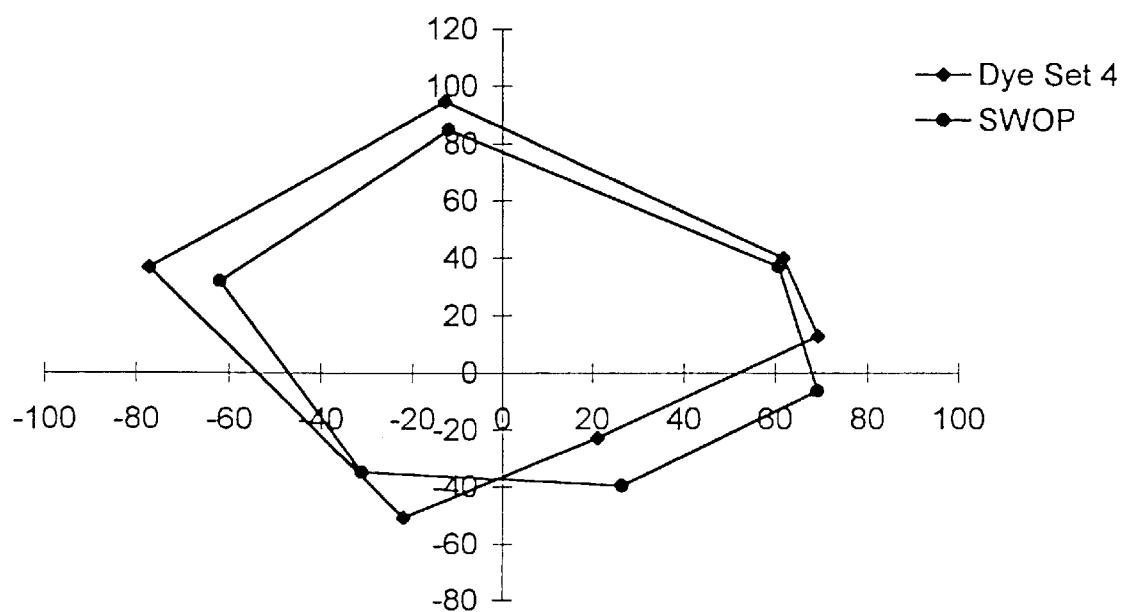
Figure 2E:
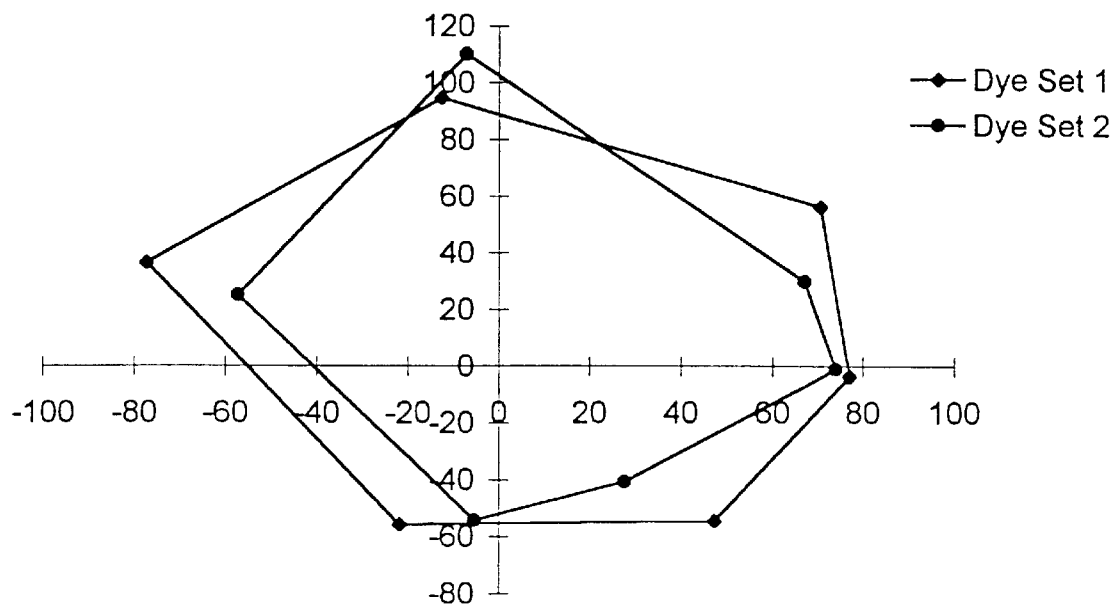
Figure 2F:
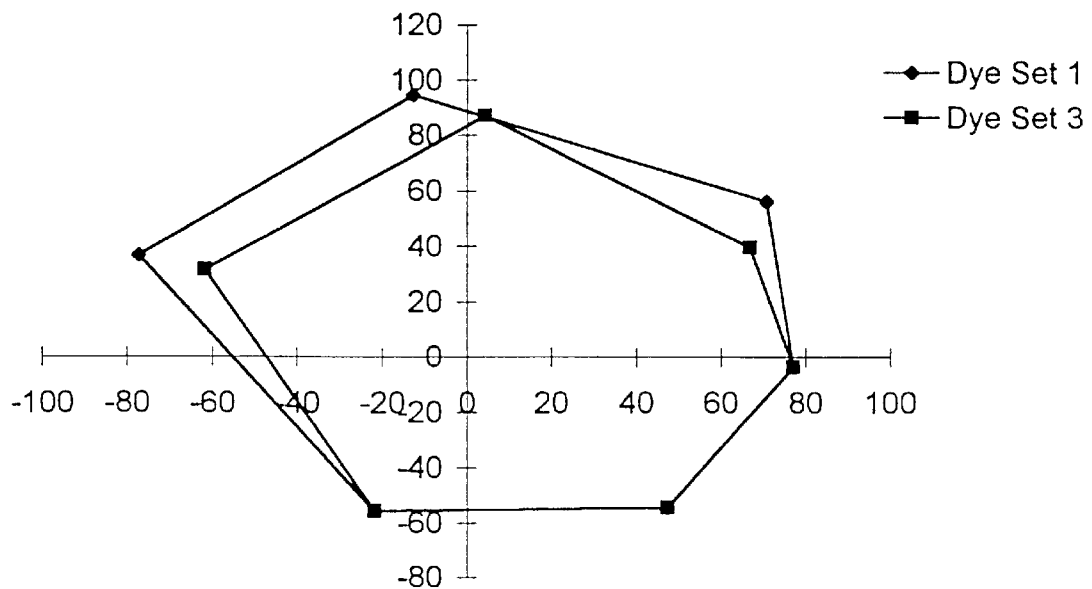
Figure 2G:
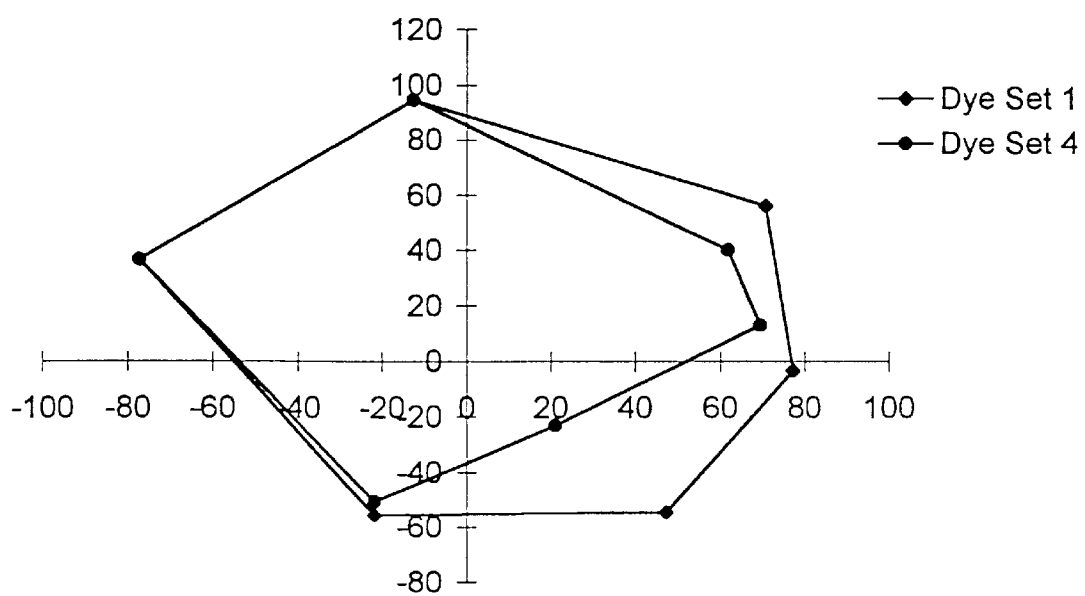
Figure 3A:
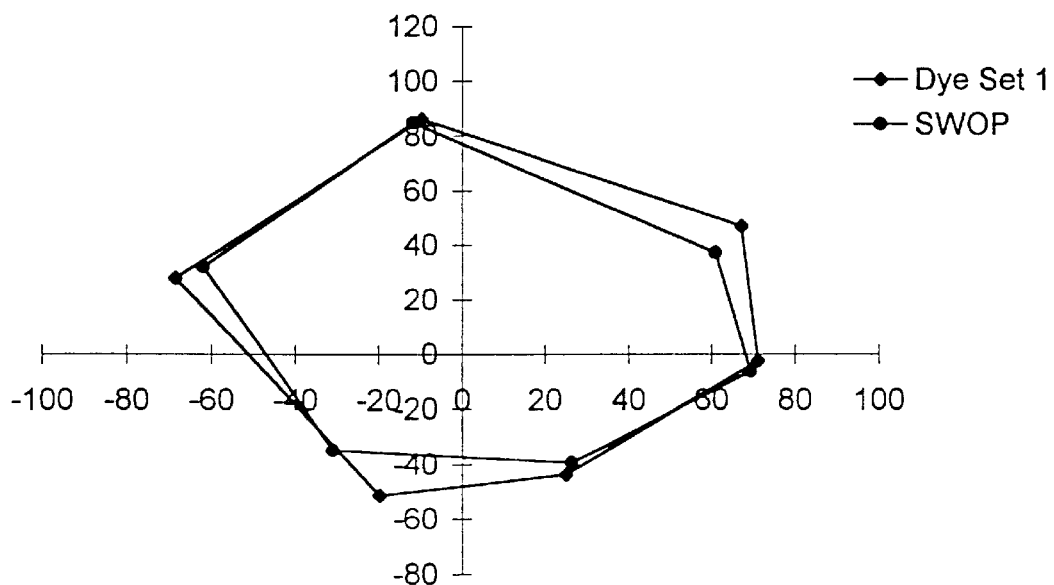
FIGS. 3a through 3d depict the effect of lightfade on the performance of Dye Set 1 as it is compared against SWOP and Dye Sets 2 through 4.
Figure 3B:
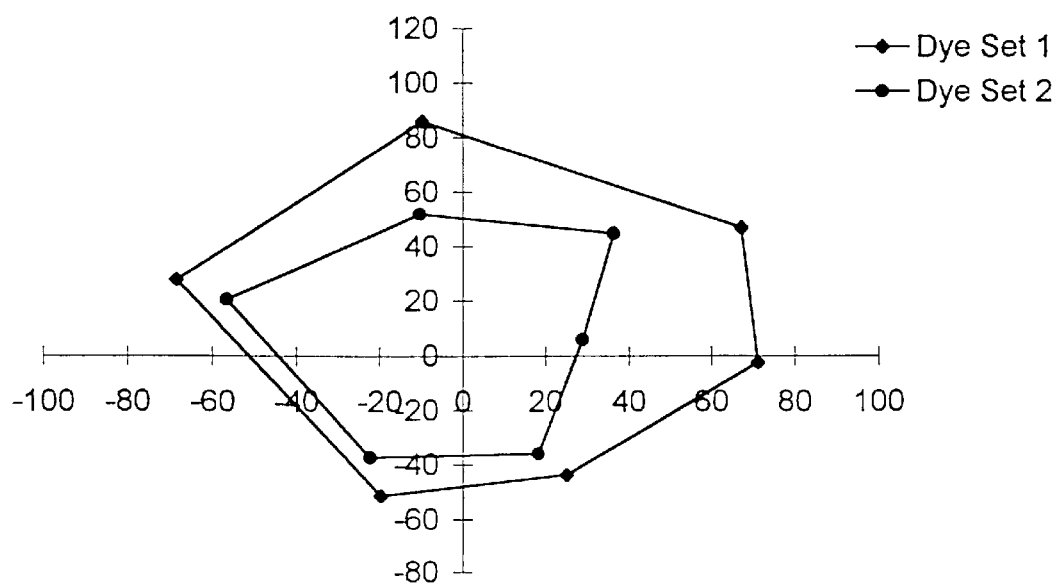
Figure 3C:
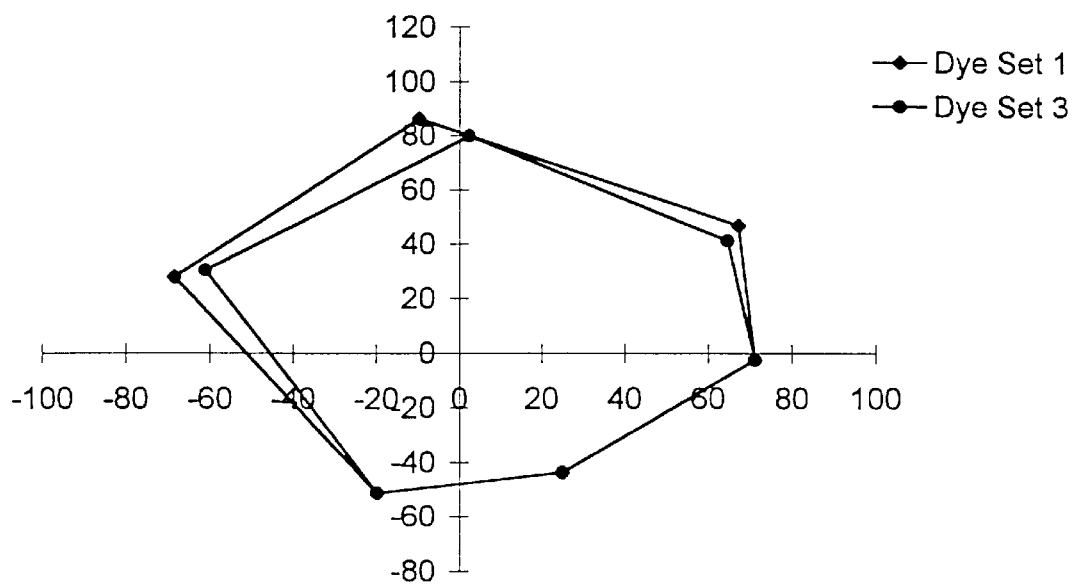
Figure 3D:
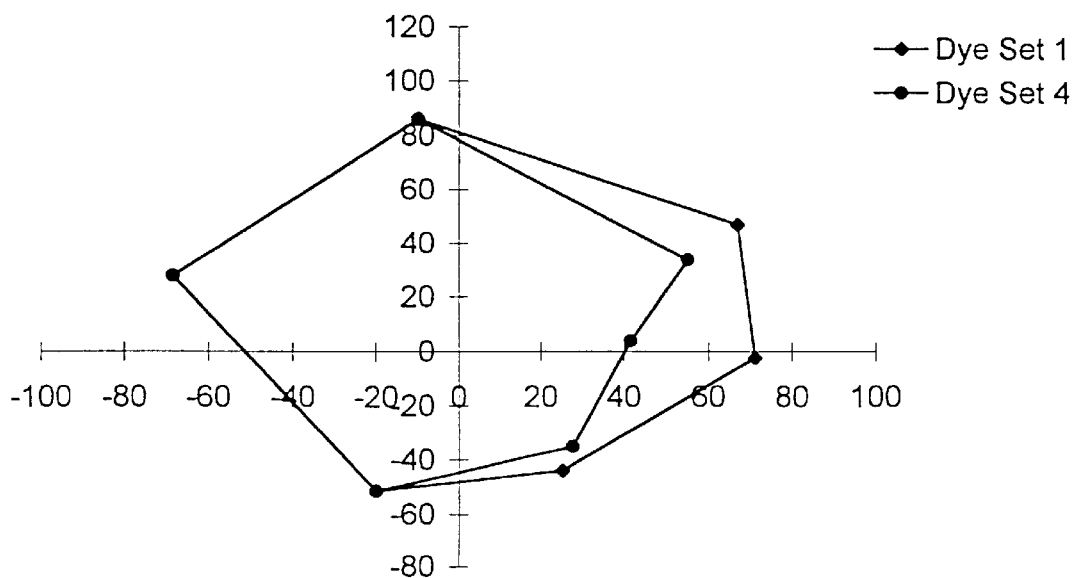

The invention described herein is directed to dye sets for use with commercially available ink-jet printers such as Design Jet printers, manufactured by Hewlett-Packard Company, of Palo Alto, Calif. More specifically, a specific dye set for formulating the yellow, cyan, magenta, and black inks is disclosed. The dye set enables the production of high-quality prints having large color gamut and excellent lightfastness. The inks formulated according to the invention produce images having color appearance which meets commercial requirements for color accuracy and durability.

The specific ink set disclosed comprises formulating the yellow, cyan, magenta, and optionally black inks, with Direct Yellow 132, Direct Blue 199, Magenta 377, and optionally Pacified Reactive Black 31, respectively. The present yellow, cyan, and magenta aqueous ink compositions each comprise in general from about 0.1 to about 5 wt % of at least one dye with the black ink comprising from about 1 to about 10 wt % of at least one colorant, and a vehicle comprising the following components (in wt % of total ink composition): from about 5 to about 20 wt % of at least one organic solvent; 0 to about 1.5 wt % of at least one component independently selected from the group consisting of surfactants, buffers, biocides, and metal chelators; and the balance water.

All concentrations herein are in weight percent of total ink composition unless otherwise indicated. The purity of all components is that employed in normal commercial practice for ink-jet inks.

Colorants

Yellow

The yellow ink of the present invention comprises Direct Yellow 132 dye (DY132), available as Pro-jet Yellow 1G from Zeneca Colors. The DY132 may be used in any one of its salt forms. The preferred yellow ink contains DY132 associated with Na ion.

The yellow dye is present in an amount from about 0.1 to about 5 wt. %, preferably, from about 2.5 to about 3.5 wt. %, and most preferably, from about 2.5 to about 3 wt. %. In setting the concentration of the yellow dye, it is desired that the ink has an absorbance of about 0.12 at the lambda maximum of 402 for a 1:10,000 dilution.

Cyan

The cyan ink of the present invention contains Direct Blue 199 dye (DB199), available from Zeneca Colors as Pro-jet Cyan 1. The DB199 may be used in any one of its salt forms. The preferred cyan ink contains DB199 associated with Na ion.

The cyan dye is present in an amount from about 0.1 to about 5 wt. %, preferably from about 2.5 to about 3.5 wt. %, and most preferably from about 2.5 to about 3 wt. %. In setting the concentration of the cyan dye, it is desired that the ink have an absorbance of about 0.10 at the lambda maximum of 618 nm for a 1,10:000 dilution.

Magenta

The magenta ink of the present invention contains Magenta 377 (M377), available from Ilford AG, Rue de l'Industrie, CH-1700 Fribourg, Switzerland. The M377 may be used in any one of its salt forms. The preferred magenta ink contains M377 associated with Na ion.

The magenta dye is present in an amount from about 0.1 to about 5 wt. %, preferably from about 2.5 to about 3.5 wt. %, and most preferably from about 2.5 to about 3 wt. %. In setting the concentration of the magenta dye, it is desired that the ink have an absorbance of about 0.08 at the lambda maximum of 518 nm for a 1:10,000 dilution.

Black

The dye set of the present invention may optionally include a black ink. The black ink suitably employed in the practice of the invention can be dye based or pigment-based colorant, preferably, dye-based. The black ink can also be a composite of the three primary colors, yellow, cyan, and magenta. Suitable black dye-based inks are disclosed and claimed, for example, in U.S. Pat. No. 4,963,189, entitled "Waterfast Ink Formulations with a Novel Series of Anionic Dyes Containing Two or More Carboxyl Groups" and assigned to the present assignee. Suitable black pigment-based inks are disclosed and claimed, for example, in U.S. Pat. No. 5,085,698, entitled "Aqueous Pigmented Inks for Ink Jet Printers"; U.S. Pat. No. 5,221,334, entitled "Aqueous Pigmented Inks for Ink Jet Printers"; and U.S. Pat. No. 5,302,197, entitled "Ink Jet Inks"; all assigned to E. I. Du Pont de Nemours and Company. Preferably the black ink comprises Reactive Black 31, Pacified Reactive Black 31, Direct Black 168, or a mixture thereof. Most preferably the black ink comprises Pacified Reactive Black 31, wherein the chromophore is present in the vinyl sulfone form, the ethyl hydroxy form, or a mixture thereof; as described in U.S. patent application Ser. No. 08/741,880, now U.S. Pat. No. 5,725,641, by MacLeod, filed Oct. 30, 1996, entitled "Lightfast Inks for Ink-Jet Printing," assigned to the assignee of the present invention, and incorporated herein by reference.

Pacified Reactive Black 31 is made by the pacification of Reactive Black 31 (RB31) dye (available as Remazol Black R-KRL from Hoechst Chemical Company) employing well know pacification methods. The pacification process is accomplished by making an aqueous solution of Reactive Black 31. The aqueous solution is heated to 60° C. The dye is then hydrolyzed by addition of sodium hydroxide in amounts sufficient to bring the pH of the solution to a range of about 8 to about 12. The pH is maintained at this range by further additions of sodium hydroxide to the solution. After the completion of the hydrolysis, the pH of the solution is lowered to about 7 using hydrochloric acid. The sulfate ions generated in the reaction, and the chloride and sodium ions added during the process, can optionally be removed by reverse osmosis or other conventional methods. The inks of present invention preferably contain less than about 1 wt % sulfate ion. More preferably the inks contain less than about 1000 parts per million sulfate ion, with less than about 100 parts per million being the most preferred. The resulting pacified dye solution will contain either or both the hydrolyzed forms, namely, vinyl sulfone form and ethyl hydroxy form. Both hydrolyzed forms of PRB 31 are lightfast and suitable to make reliable ink-jet inks.

The black colorant is present in an amount from about 1 to about 10 wt. %, preferably, from about 2 to about 7 wt. %, and most preferably, from about 3 to about 5 wt. %. In setting the concentration of the black colorant, it is desired that the ink have an absorbance of about 0.14 at the lambda maximum of 570 nm for a 1:10,000 dilution.

Vehicle

The inks of the present invention comprise an aqueous vehicle comprising the following components (in wt % of total ink composition): from about 5 to about 20 wt % of at least one water soluble organic solvent; 0 to about 1.5 wt % of at least one component independently selected from the group consisting of surfactants, buffers, biocides, and metal chelators; and the balance water.

Organic Solvent

The inks of the present invention comprise from about 5 to about 20 wt % organic solvent. More preferably, the inks comprise from about 8 to about 15 wt % organic solvent, with a concentration from about 10 to about 13 wt % being the most preferred.

The water soluble organic solvents suitably employed in the present ink-jet ink compositions include any of, or a mixture of two or more, of such compounds as nitrogen-containing heterocyclic ketones, such as 2-pyrrolidone, N-methyl-pyrrolid-2-one (NMP), 1,3-dimethylimidazolid-2-one, and octyl-pyrrolidone; diols such as ethanediols, (e.g., 1,2-ethandiol), propanediols (e.g., 1,2-propanediol, 1,3-propanediol, 2-ethyl-2-hydroxy-methyl-1,3-propanediol, ethylhydroxy-propanediol (EHPD), butanediols (e.g., 1,2-butanediol, 1,3-butanediol, 1,4-butanediol), pentanediols (e.g., 1,2-pentanediol, 1,5-pentanediol), hexanediols (e.g., 1,6-hexanediol, 2,5-hexanediol, 1,2-hexanediol), heptanediols (e.g., 1,2-heptanediol, 1,7-heptanediol), octanediols (e.g., 1,2-octanediol, 1,8-octanediol); glycols and thioglycols, commonly employed in ink-jet inks, such as polyalkylene glycols such as polyethylene glycols (e.g., diethylene glycol (DEG), triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400), and thiodiglycol; and glycol ethers such as dipropylene glycol monobutyl ether, propylene glycol monobutyl ether, and ethylene glycol monobutyl ether, diethylene glycol monohexyl ether.

Preferably, the organic solvent comprises 1,2 diols of $C_5$-$C_7$, namely, 1,2-pentanediol, 1,2-hexanediol, and 1,2-heptanediol; and most preferably, 1,2-hexanediol is employed in the practice of the invention. Preferably, the organic solvent also comprises from about 0.1 to about 2 wt % dipropylene glycol monobutyl ether, more preferably, from about 0.25 to about 1.5 wt %, and most preferably, from about 0.4 to about 1.0 wt %.

Surfactant

The inks of the present invention optionally comprise 0 to about 1.5 wt % surfactant. More preferably, the inks comprise from about 0.5 to about 1.3 wt % surfactant, with a concentration from about 0.8 to about 1.2 wt % being the most preferred.

In the practice of the invention, one or more surfactants may optionally be used. Non-ionic surfactants, such as secondary alcohol ethoxylates (e.g., Tergitol series available from Union Carbide Co.), non-ionic fluoro surfactants (e.g., FC170C available from 3M, non-ionic fatty acid ethoxylate surfactants (e.g., Alkamul PSMO-20 available from Rhone-Poulenc), non-ionic silicone surfactants (e.g., SilwetL7600 available from OSi Specialties, Inc. Danburg, Conn.), and fatty amide ethoxylate surfactants (e.g., Aldamide L203 available from Rhone-Poulenc) are preferred, with secondary alcohol ethoxylates being the most preferred. In the practice of the invention, the surfactant serves to prevent color to color bleed by increasing the penetration of the inks into the print medium, and to improve the spread of the ink on polymer coated media. Secondary alcohol ethoxylates are nonionic surfactants and are commercially available, for example, from Union Carbide Co. (Houston, Tex.) as the Tergitol series, such as Tergitol 15-S-5 and Tergitol 1 5-S-7.

The secondary alcohol ethoxylates contain (a) an aliphatic chain having a prescribed number of carbon atoms in the chain, and (b) a prescribed number of ethoxylated units. These ethoxylates are commercially available as mixtures of ethoxylates, and so are described in terms of the predominance of a given compound. Secondary alcohol ethoxylates suitably employed in the practice of the invention predominantly have from about 12 to about 18 carbon atoms in the aliphatic chain, while the number of ethoxylated units is predominantly in the range of from about 4 to about 8 units. Thus, "Tergitol 15-S-5" represents a secondary alcohol ethoxylate surfactant predominantly having about 15 carbons in its aliphatic chain and about 5 ethoxylated units. Tergitol 15-S-5 and Tergitol 15-S-7 are the preferred surfactants, with a mixture of Tergitol 15-S-5 and Tergitol 15-S-7 being the most preferred.

Buffer

The inks of the present invention optionally comprise 0 to about 1.5 wt % buffer. More preferably, the inks comprise from about 0.1 to about 0.5 wt % buffer, with a concentration from about 0.1 to about 0.3 wt % being the most preferred.

Buffers employed in the practice of the invention to modulate pH can be organic-based biological buffers or inorganic buffers, preferably, organic-based. Further, the buffers employed should maintain a pH ranging from about 3 to about 9 in the practice of the invention, preferably about 6.5 to about 8 and most preferably from about 7.2 to 7.8. Examples of preferably-employed buffers include Trizma Base, available from companies such as Aldrich Chemical (Milwaukee, Wis.), 4-morpholineethanesulfonic acid (MES), b-hydroxy-4-morpholinepropanesulfonic acid (MOPSO), and 4-morpholinepropanesulfonic acid (MOPS). Most preferably, MOPSO is employed in the practice of the invention.

Metal Chelator

The inks of the present invention optionally comprise 0 to about 1.5 wt % metal chelator. More preferably, the inks comprise from about 0.1 to about 0.5 wt % metal chelator, with a concentration from about 0.1 to about 0.3 wt % being the most preferred.

Metal chelators employed in the practice of the invention are used to bind transition metal cations that may be present in the ink. Examples of preferably-employed metal chelators include: Ethylenediaminetetraacetic acid (EDTA), Diethylenetriaminepentaacetic acid (DTPA), trans-1,2-diaminocyclohexanetetraacetic acid (CDTA), (ethylenedioxy) diethylenedinitrilotetraacetic acid (EGTA), or other chelators that can bind transition metal actions. More preferably, EDTA, and DTPA; and most preferably EDTA in its disodium salt form is employed in the practice of the invention.

Biocide

The inks of the present invention optionally comprise 0 to about 1.5 wt % biocide. More preferably, the inks comprise from about 0.1 to about 0.5 wt % biocide, with a concentration from about 0.1 to about 0.3 wt % being the most preferred.

Any of the biocides commonly employed in ink-jet inks may be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide.

INDUSTRIAL APPLICABILITY

The specific ink set disclosed herein is expected to find commercial use in ink-jet color printing.

EXAMPLES

Inks were formulated and different qualities of the formulated inks were measured in an effort to assess the benefits attained in the practice of the invention, namely, effect of the dye set on color gamut and lightfade for the primary and secondary colors, and long resistor life for a printing system using refilling heads.

Print Sample Generation Method

Print samples of formulated inks, where necessary, were generated using a Hewlett-Packard Design Jet 2500CP® printer. The print media used included one or more of the following: uncoated paper such as HP C6036A available from Hewlett-Packard Company, Palo Alto, Calif.; matte coated paper such as silica coated paper BP C6028A available from Hewlett-Packard Company; and polymer coated polyester media such as HP C3885A available from Hewlett-Packard Company; polymer coated vinyl film media such as Jet Set 1000N available from Avery, Marking Films Division, Tex., and glossy gelatin coated paper media such as HP C6034A available from Hewlett-Packard Company.

Ink Formulations

Ink sets were prepared containing the dyes listed in Table 1.

TABLE 1

| DYES | YELLOW | CYAN | MAGENTA | BLACK |
| --- | --- | --- | --- | --- |
| INK SET 1 | Direct Yellow 132 | Direct Blue 199 | Magenta 377 | Pacified Reactive Black 31 |
| INK SET 2 | Acid Yellow 23/Direct Yellow 86 | Acid Blue 9/ Direct Blue 199 | Acid Red 52/ Reactive Red 180 | Pigment Black 7 |
| INK SET 3 | [1]Yellow 104 | Direct Blue 199 | Magenta 377 | Pacified Reactive Black 31 |
| INK SET 4 | Direct Yellow 132 | Direct Blue 199 | Reactive Red 29 | Food Black 2 |
| INK SET 5 | Direct Yellow 86 | Direct Blue 199 | Direct Red 227 | Direct Black 168 |

[1]Available from Ilford AG, Rue de l'Industrie, CH-1700 Fribourg, Switzerland.

The concentrations of the yellow, cyan, magenta, and black inks were set using the visible optical absorbance at a 1:10,000 dilution Yellow—about 0.12 at the $\text{lambda}_{max}$ 402 nm Cyan—about 0.10 at the $\text{lambda}_{max}$ 618 nm Magenta—about 0.08 at the $\text{lambda}_{max}$ 518 nm Black—about 0.14 at the $\text{lambda}_{max}$ 570 nm The aqueous vehicle for the ink sets comprised

| organic solvent | 10.0 | 1,2-hexanediol |
| --- | --- | --- |
|  | 1.0 | dipropylene glycol monobutyl ether |
| surfactant | 0.5 | Tergitol 15-S-5 |
|  | 0.5 | Tergitol 15-S-7 |
| buffer | 0.3 | MOPSO |
| metal chelator | 0.2 | EDTA |
| biocide | 0.1 | Proxel GXL |
| balance |  | water |

Example 1

Effect of Dye Set on Color Quality

The effect of dye sets 1–4 on color quality was measured by generating color palette squares of approximately 1 cm$^2$ of the three primaries, namely, yellow, cyan, and magenta; and the three secondaries, namely, red, green, and blue; and black, using inks formulated according to the above dye sets and vehicle on polymer coated polyester film. The color palettes were generated using Dot on Dot print mode at 100% print density using a nominal drop volume of about 20 pl per 600 dpi pixel per color plane.

The L*, a*, and b* coordinates of the printed samples were measured using a commercial colorimeter such as Hunter Ultrascan, made by Hunter Associates Laboratories, Reston, Va., U.S.A., using standard color measurement procedures, and are reported in Table 2. The color space for each print sample is represented in FIGS. 1(a) though 1(d).

TABLE 2

| COLOR | L* | a* | b* | L* | a* | b* | L* | a* | b* | L* | a* | b* |
|---|---|---|---|---|---|---|---|---|---|---|---|---|
| | DYE SET 1 | | | DYE SET 2 | | | DYE SET 3 | | | DYE SET 4 | | |
| Red | 41.31 | 70.57 | 56.18 | 40.68 | 67.06 | 29.91 | 35.84 | 66.83 | 39.59 | 42.58 | 61.79 | 39.98 |
| White | 96.31 | 0.24 | −0.65 | 96.31 | 0.24 | −0.65 | 96.31 | 0.24 | −0.65 | 96.31 | 0.24 | −0.65 |
| Green | 48.79 | −77.15 | 36.63 | 43.4 | −57.33 | 25.15 | 36.35 | −61.73 | 31.37 | 48.79 | −77.15 | 36.63 |
| Black | 19 | 9.11 | 2.64 | 25.41 | 0.73 | 2.71 | 19 | 9.11 | 2.64 | 19.23 | 3.71 | −4.13 |
| Blue | 9.75 | 47.27 | −54.45 | 20.04 | 27.69 | −40.64 | 6.19 | 17.12 | −34.37 | 22.92 | 21.03 | −23.04 |
| Magenta | 40.91 | 77.05 | −3.51 | 38.85 | 74 | −1.16 | 33.52 | 74.78 | 21.49 | 40.37 | 69.39 | 12.84 |
| Cyan | 55.8 | −21.86 | −50.72 | 45.02 | −5.35 | −54.11 | 48.07 | −12.52 | −55.69 | 55.8 | −21.86 | −50.72 |
| Yellow | 86.64 | −12.69 | 94.56 | 89.82 | −7.16 | 110 | 81.72 | 3.42 | 87.96 | 86.64 | −12.69 | 94.56 |

The color space for the dyes sets were then compared against the Standard Web Offset Printing data (SWOP) presented in Table 3, and Dye Set 1, and are illustrated in FIGS. 2(a) through 2(g).

TABLE 3

| COLOR | L* | a* | b* |
|---|---|---|---|
| Red | 44.5 | 60.81 | 37.05 |
| White | 97 | 0 | 0 |
| Green | 53.61 | −61.9 | 31.99 |
| Black | 9.48 | 0.9 | 1.56 |
| Blue | 26.35 | 26.47 | −39.64 |
| Magenta | 44.73 | 69.23 | −6.37 |
| Cyan | 58.27 | −31.05 | −34.88 |
| Yellow | 83.38 | −11.87 | 84.71 |

As can be noted from the data presented in FIGS. 1(a)–1(d) and 2(a)–2(g), the inks formulated according to the invention comprising Dye Set 1 encompassed the SWOP color space and provided the closest color performance when compared to SWOP.

Example 2
Effect of Dye Set of Lightface

Two sets of color palettes were generated for each dye set 1–4 and media combination using the same procedure as described in Example 1. One of the print samples for each of the ink/media combinations was placed in the dark and the other was exposed to the equivalent of three months outdoor lightfade using an Atlas Ci 3000 Weatherometer, available from Atlas Electric Devices, Co., using instrument settings of 0.35 W/M$^2$ at 340 nm for irradiance, and Temp= 42° C., humidity=35% RH.

The color coordinates, L*, a*, and b* of the printed samples on the two sheets (one kept in the dark and the other exposed to outdoor lightfade conditions) for each of ink/ media combinations, were measured using the procedure described in Example 1, above. Light fade, represented by ΔE, for each sample was calculated using Equation 4, above.

The after fade color space for the dyes sets were then compared against Dye Set 1, and are illustrated in FIGS. 3(a) through 3(d).

As can be noted from the data presented in FIGS. 3(a) through 3(d), inks formulated according to the invention comprising Dye Set 1, provided the best lightfade performance and the best match to SWOP colors.

Example 3
Effect of Dye Set on Ink-Jet Pen Reliability

The reliability of the inks in ink-jet pens was assessed by evaluating the "kogation" performance of the inks. Kogation is a phenomenon in which the pen is not able to print due to the accumulation of undesired material from the ink on the surface of the resistor in the firing chamber. This accumulation can manifest itself as ink drops having a reduced drop weight when compared to the original drop weight. The formulated inks comprising dye sets 1,2, and 5 were filled into ink-jet print cartridges, part number HP C1806A available from Hewlett-Packard Company.

All ink-filled pens were tested to ensure that all nozzles were in working condition. The nozzles for each pen were then activated to eject drops of ink. The weight of ink drop per nozzle was measured. Each nozzle was then set to eject 100 million and 200 million drops of ink. The weight of ink drop per nozzle was measured after ejection of 100 million and 200 million drops of ink per nozzle. The percent weight of ink drop retained after the firings was then calculated and is reported in FIG. 4.

Figure 4:
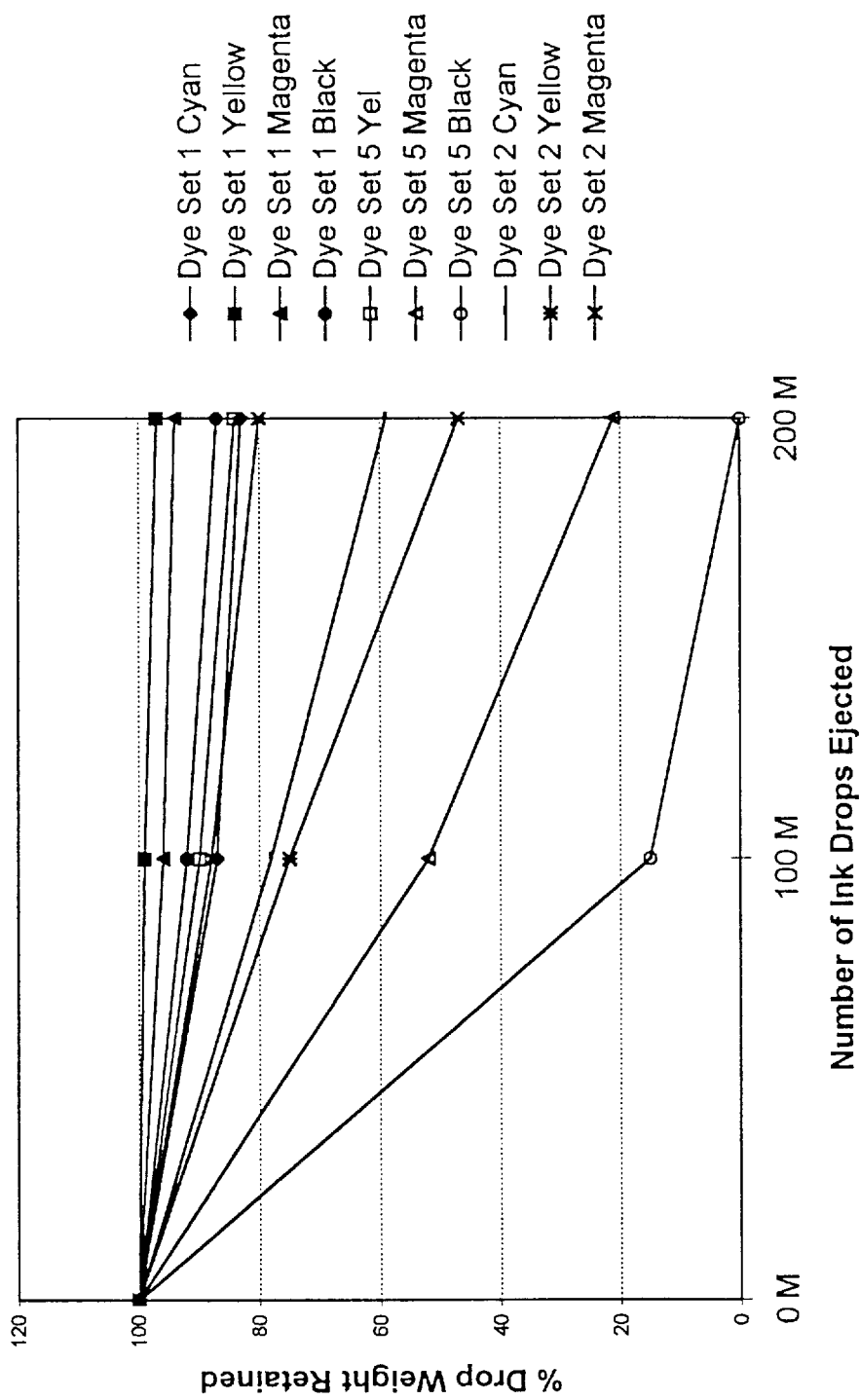
FIG. 4 depicts is a plot of % drop weight retained versus number of ink drops ejected depicting the pen reliability performance of Dye Sets 1,2 and 5.

As can be noted from the data in FIG. 4, the inks formulated according to the present invention demonstrated the best ink drop weight stability.

Thus, it has been demonstrated that inks formulated according to the present invention to include a dye set comprising Direct Yellow 132, Direct Blue199, Magenta 377, and optionally Pacified Reactive Black 31 provide ink-jet prints having excellent color performance, lightfade, and pen reliability performance.

What is claimed is:

1. An ink set for ink-jet printing, comprising:
   a yellow ink comprising Direct Yellow 132;
   a magenta ink comprising Magenta 377; and
   a cyan ink comprising Direct Blue 199.

2. The set of ink-jet inks of claim 1 wherein each of said yellow, cyan, and magenta inks comprises from about 0.1 to about 5 wt % dye.

3. The set of ink-jet inks of claim 1 wherein each of said yellow, cyan, and magenta inks comprises from about 2.5 to about 3.5 wt % dye.

4. The set of ink-jet inks of claim 1 wherein each of said yellow, cyan, and magenta inks comprises from about 2.5 to about 3 wt % dye.

5. The ink set of claim 1 wherein each of said yellow, cyan, and magenta inks further comprises:
   about 5 to about 20 wt % of at least one organic solvent;
   0 to about 1.5 wt % of at least one component independently selected from the group consisting of surfactants, buffers, biocides, and metal chelators.

6. The ink set of claim 5 wherein:
   the organic solvent is selected from the group consisting of nitrogen-containing heterocyclic ketones, diols, glycols, thioglycols, thiodiglycols, glycol ethers, and mixtures thereof.

7. The ink set of claim 6 wherein the organic solvent comprises:
   1,2-diol of from 5 to 7 carbon atoms; and
   optionally from about 0.1 to about 2 wt % dipropylene glycol monobutyl ether.

8. The ink set of claim 1 further comprising a black ink.

9. The ink set of claim 8 wherein the black ink comprises a dye selected from the group consisting of Reactive Black 31 dye, Direct Black 168, and Pacified Reactive Black 31.

10. The ink set of claim 9 wherein the black dye is Pacified Reactive Black 31.

11. The ink set of claim 9 wherein the concentration of said black dye is from about 1 to about 10 wt %.

12. The ink set of claim 9 wherein the concentration of said dye is from about 2 to about 7 wt %.

13. The ink set of claim 9 wherein the concentration of said dye is from about 3 to about 5 wt %.

14. A method for ink-jet printing, comprising:

providing a yellow ink comprising Direct Yellow 132;

providing a magenta ink comprising Magenta 377;

providing a cyan ink comprising Direct Blue 199; and printing said inks on a printing medium by means of an ink-jet pen.

15. The method of claim 14 wherein each of said yellow, cyan, and magenta inks comprises from about 0.1 to about 5 wt % dye.

16. The method of claim 14 wherein each of said yellow, cyan, and magenta inks comprises from about 2.5 to about 3.5 wt % dye.

17. The method of claim 14 wherein each of said yellow, cyan, and magenta inks comprises from about 2.5 to about 3 wt % dye.

18. The method of claim 14 wherein each of said yellow, cyan, and magenta inks further comprises:

about 5 to about 20 wt % of at least one organic solvent;

0 to about 1.5 wt % of at least one component independently selected from the group consisting of surfactants, buffers, biocides, and metal chelators.

19. The method of claim 18 wherein:

the organic solvent is selected from the group consisting of nitrogen-containing heterocyclic ketones, diols, glycols, thioglycols, thiodiglycols, glycol ethers, and mixtures thereof.

20. The method of claim 19 wherein the organic solvent comprises:

1,2-diol of from 5 to 7 carbon atoms; and optionally from about 0.1 to about 2 wt % dipropylene glycol monobutyl ether.

21. The method of claim 14 further comprising providing a black ink.

22. The method of claim 21 wherein the black ink comprising a dye selected from the group consisting of Reactive Black 31 dye, Direct Black 168, and Pacified Reactive Black 31.

23. The method of claim 22 wherein the black dye is Pacified Reactive Black 31.

24. The method of claim 22 wherein the concentration of said dye is from about 1 to about 10 wt %.

25. The method of claim 22 wherein the concentration of said dye is from about 2to about 7 wt %.

26. The method of claim 22 wherein the concentration of said dye is from about 3 to about 5 wt %.

27. The method of claim 14 further comprising a black ink wherein the black ink is formed on the printing medium by the addition of the yellow ink, the cyan ink, and the magenta ink.

\* \* \* \* \*

UNITED STATES PATENT AND TRADEMARK OFFICE
CERTIFICATE OF CORRECTION

PATENT NO. : 5,851,273
DATED : December 22, 1998
INVENTOR(S) : Peter C. Morris et al.

It is certified that error appears in the above-identified patent and that said Letters Patent is hereby corrected as shown below:

Column 2, line 24 of the Patent, insert --½-- after $C*=(a*^2+b*^2)$.

Signed and Sealed this

Seventh Day of December, 1999

Q. TODD DICKINSON

*Attest:*

*Attesting Officer*   *Acting Commissioner of Patents and Trademarks*